(12) United States Patent
Devreese (10) Patent No.: US 12,140,218 B2
(45) Date of Patent: Nov. 12, 2024

(54) INTEGRATED GEARBOX IN ELECTRIC MOTOR SYSTEMS

(71) Applicant: Dana Automotive Systems Group, LLC, Maumee, OH (US)

(72) Inventor: Thibault Devreese, Ghent (BE)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 183 days.

(21) Appl. No.: 17/456,539

(22) Filed: Nov. 24, 2021

(65) Prior Publication Data

US 2023/0160464 A1    May 25, 2023

(51) Int. Cl.
*F16H 57/02*    (2012.01)
*B60K 1/00*    (2006.01)
*F16H 57/04*    (2010.01)

(52) U.S. Cl.
CPC ........ *F16H 57/02* (2013.01); *B60K 2001/001* (2013.01); *F16H 2057/02034* (2013.01); *F16H 2057/02052* (2013.01); *F16H 57/0476* (2013.01)

(58) Field of Classification Search
CPC . F16H 2057/02052; F16H 2057/02034; F16H 57/02; F16H 57/0476; B60K 2001/001; B60K 17/12; B60K 17/16; B60K 17/08
See application file for complete search history.

(56) References Cited

U.S. PATENT DOCUMENTS

| | | | |
|---|---|---|---|
| 6,484,834 B2 | 11/2002 | Bowen et al. | |
| 6,513,401 B2 * | 2/2003 | Bologna | F16H 57/023 74/397 |
| 9,435,415 B2 | 9/2016 | Gassmann | |
| 10,355,556 B2 * | 7/2019 | Komi | H02K 7/006 |
| 10,591,025 B2 | 3/2020 | Fliearman et al. | |
| 11,002,352 B2 * | 5/2021 | Ghatti | F16H 48/08 |
| 11,247,548 B2 * | 2/2022 | Devreese | B60B 35/163 |
| 2018/0287467 A1 * | 10/2018 | Ogino | B60L 3/0061 |
| 2020/0158216 A1 * | 5/2020 | Hibino | B60K 1/00 |
| 2021/0071751 A1 * | 3/2021 | Fujii | H02K 9/193 |

FOREIGN PATENT DOCUMENTS

| | | | | |
|---|---|---|---|---|
| CN | 106476605 A | * | 3/2017 | B60K 1/00 |
| CN | 108608853 A | * | 10/2018 | |
| CN | 109050236 A | * | 12/2018 | |
| CN | 109203965 A | * | 1/2019 | |
| CN | 109203966 A | * | 1/2019 | |
| CN | 209096464 U | * | 7/2019 | |
| CN | 110657206 A | * | 1/2020 | F16H 3/64 |
| CN | 210478393 U | | 5/2020 | |
| DE | 102018204988 A1 | * | 10/2019 | |
| DE | 102020203126 A1 | * | 9/2021 | |

(Continued)

OTHER PUBLICATIONS

CN 108608853 A1 translation (Year: 2019).*

(Continued)

*Primary Examiner* — Huan Le
(74) *Attorney, Agent, or Firm* — McCoy Russell LLP (57) ABSTRACT

Systems are described for integrating a gearbox and an electric motor in a same housing. In one example, a system may include enclosing a gearbox containing an idler gear configured to drive an accessory gear coupled to a differential.

15 Claims, 4 Drawing Sheets

(56) References Cited

FOREIGN PATENT DOCUMENTS

| JP | 2012147598 A | * | 8/2012 | |
|---|---|---|---|---|
| WO | WO-2016150330 A1 | * | 9/2016 | ............... B60K 1/02 |
| WO | WO-2020001588 A1 | * | 1/2020 | ............... B60K 1/00 |
| WO | WO-2021054938 A1 | * | 3/2021 | ............ B60K 17/08 |
| WO | WO-2021160717 A1 | * | 8/2021 | |

OTHER PUBLICATIONS

CN 109050236 A1 translation (Year: 2019).*
CN 109203965A1 translation (Year: 2019).*
DE 102018204988 A1 translation (Year: 2019).*
JP 2012147598 A1 translation (Year: 2019).*
WO 2020001588 A1 translation (Year: 2019).*
WO 2021160717 A1 translation (Year: 2019).*
CN 110657206 A1 translation (Year: 2019).*
CN 209096464 U1 translation (Year: 2019).*
CN 210478393 U1 translation (Year: 2019).*
WO 2016150330 A1 translation (Year: 2019).*
FIT translation (Year: 2016).*
Devreese, T., "Integrated Gearbox in Electric Motor Systems," U.S. Appl. No. 17/326,144, filed May 20, 2021, 37 pages.

* cited by examiner

INTEGRATED GEARBOX IN ELECTRIC MOTOR SYSTEMS

TECHNICAL FIELD

The present description relates generally to systems for integrating a gearbox into a housing of an electric motor for a vehicle.

BACKGROUND AND SUMMARY

In electric vehicles, the powertrain architecture may include a high voltage battery, an electric motor with power controller electronics, and a transmission, which may include a gearbox. Voltage from the battery may be supplied to the electric motor in order for the electric motor to generate power to drive the electric vehicle, which may then be transmitted to the drive wheels via the gearbox.

Multi-speed transmissions have been deployed in certain electric vehicles (EVs) due to their increased responsiveness and the gains in motor operating efficiency that the transmission affords when compared to EVs using single speed geartrains. Tradeoffs may however be made between the number of selectable gears and transmission efficiency due to losses that arise from geartrains with a comparatively high number of gears. Further, transmissions with a relatively high number of selectable gears may pose packaging constraints on other vehicle systems such as the suspension and energy storage systems. Further, previous powertrains have exhibited inefficiencies in their cooling system designs which use independent coolant loops for motor and transmission cooling.

U.S. Pat. No. 9,435,415 B2 to Gassmann discloses an electric drive for a motor vehicle. In one of the embodiments presented in Gassmann, the electric drive includes a switchable planetary drive with two planetary gear stages, which are coupled in parallel. The electric drive additionally includes a switching clutch with a sliding sleeve that allows the system to switch between multiple ratios by grounding two distinct ring gears in the system.

The inventors have recognized several drawbacks with Gassmann's transmission system as well as other previous electric drivelines. Gassmann's transmission may exhibit space inefficiencies due to the use of a multi-stage planetary gear reduction. Consequently, difficulties may arise when attempting to package the transmission into vehicle platforms with rigorous packaging demands. Using a multistage planetary reduction increases geartrain losses, when compared to transmissions with fewer stages.

The inventors have recognized the aforementioned issues and developed a gearbox assembly including an electric motor enclosed in a housing and a gearbox enclosed in the housing. The gearbox includes an idler gear coupled to an electric motor gear. In this way, a more power dense transmission is provided while reducing a packaging size.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIG. 3 is shown approximately to scale.

DETAILED DESCRIPTION

Figure 2:
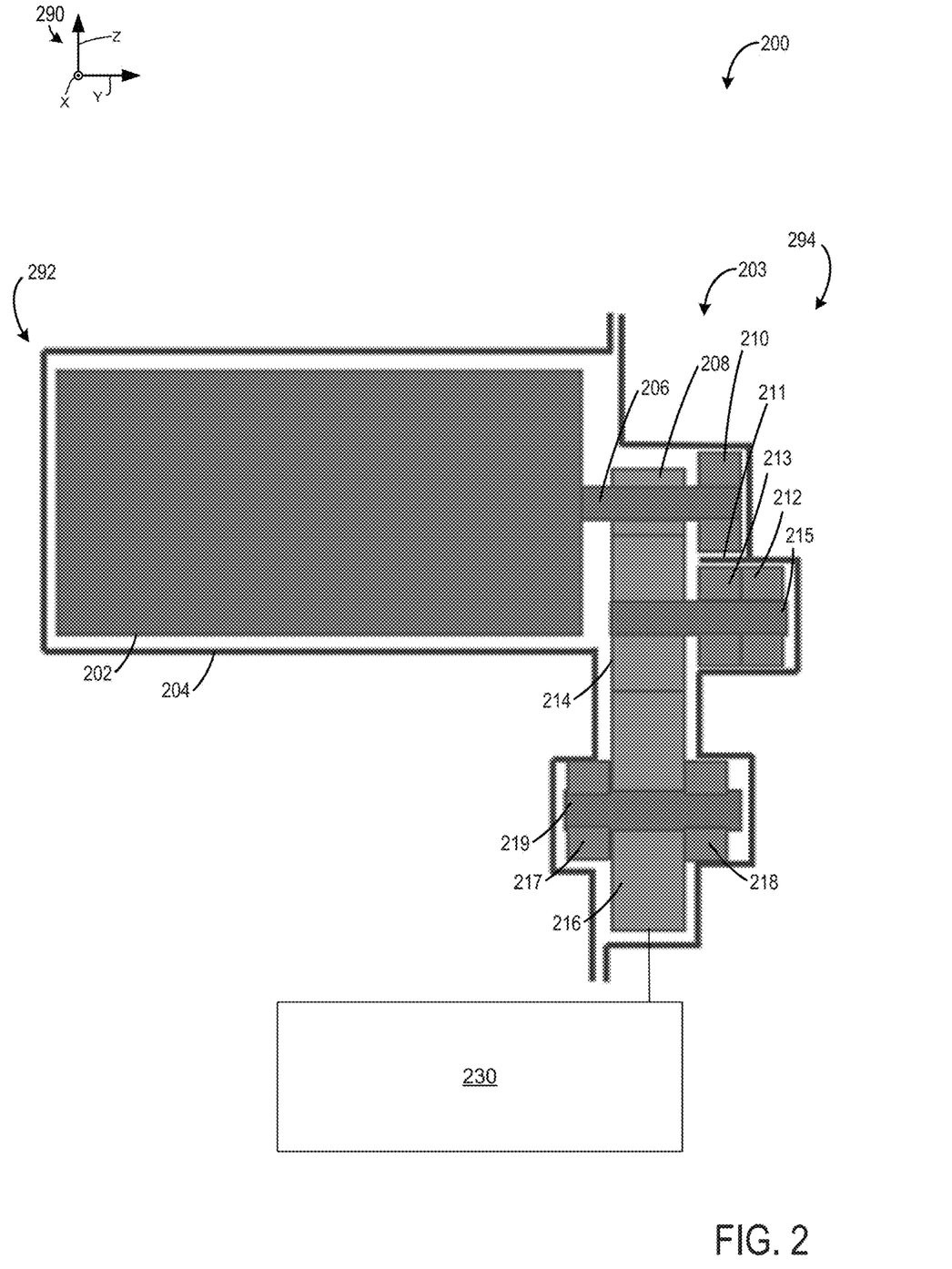
FIG. 2 shows a schematic example of a first configuration of a gearbox and the electric motor of a vehicle integrated into a same housing.
Figure 3:
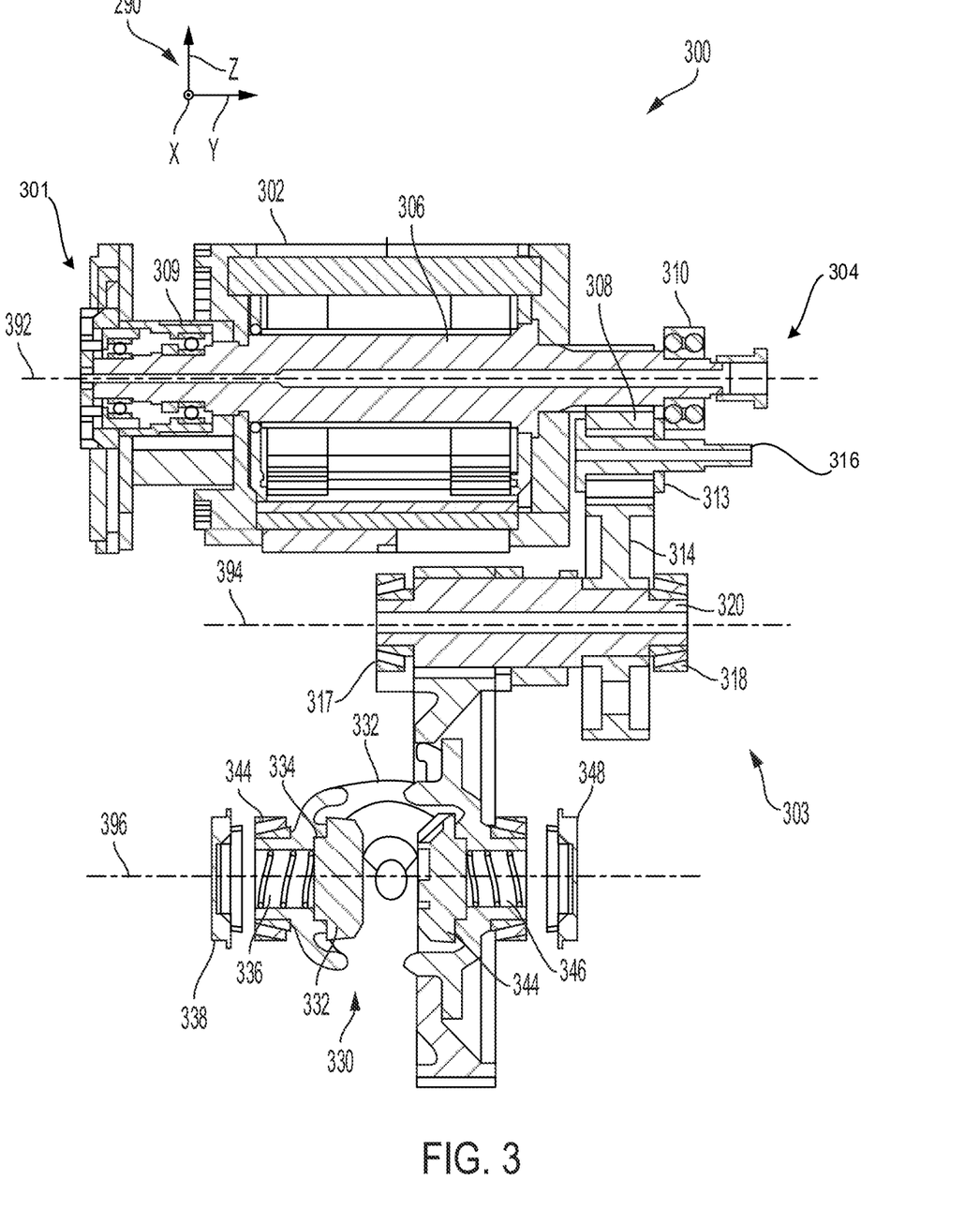
FIG. 3 shows a schematic example of a second configuration of the gearbox and the electric motor of a vehicle.
Figure 4:
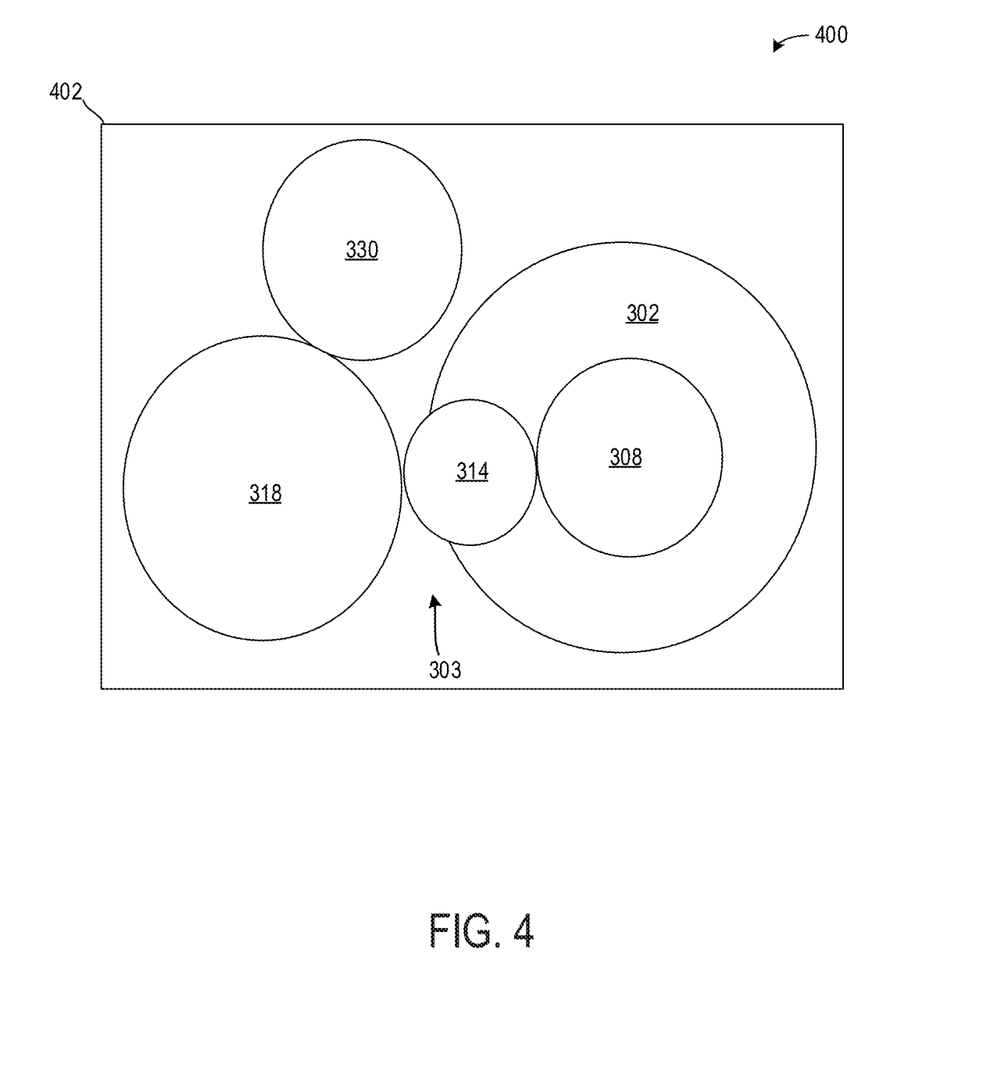
FIG. 4 shows a schematic of the electric motor, the gearbox, and a differential arranged in a same housing.

The following description relates to systems for enclosing a gearbox within a housing of an electric motor. Such systems may be integrated in a vehicle system, shown schematically in FIG. 1. A gearbox including an idler gear for increased power density may be integrated within the housing of the electric motor as shown in FIGS. 2-3. A differential may also be included in the housing, as shown in FIG. 4.

Figure 1:
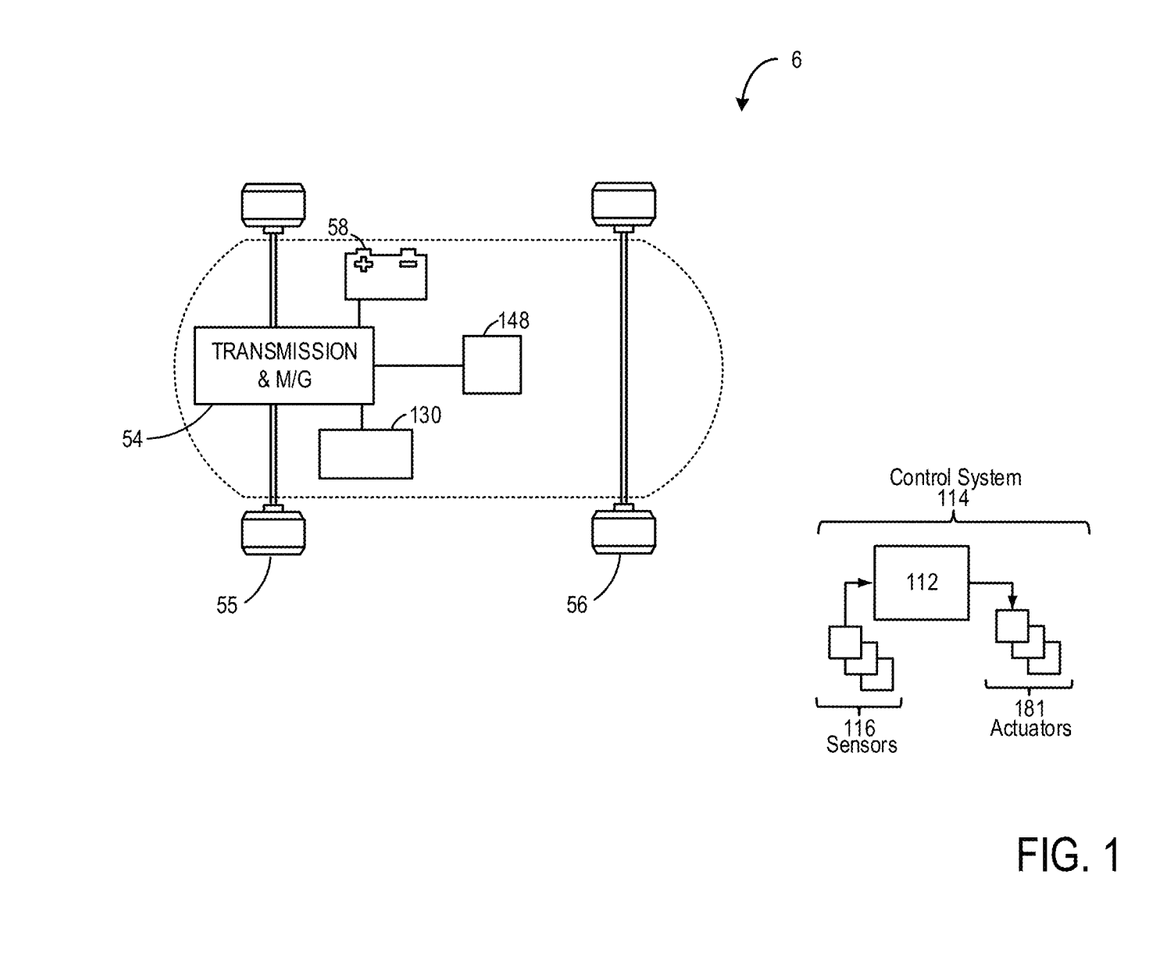
FIG. 1 shows a schematic example of an electric motor in a vehicle.

FIG. 1 shows a schematic depiction of a vehicle system 6 that can derive propulsion power from an electric motor 54. Electric motor 54 receives electrical power from a traction battery 58 to provide torque to rear vehicle wheels 55. Electric motor 54 may also be operated as a generator to provide electrical power to charge traction battery 58, for example, during a braking operation. It should be appreciated that while FIG. 1 depicts an electric motor 54 mounted in a rear wheel drive configuration, other configurations are possible, such as employing electric motor 54 in a front wheel configuration, or in a configuration in which there is an electric motor mounted to both the rear vehicle wheels 55 and front vehicle wheels 56.

Electric motor 54 may include a gearbox integrated therein (to be described further therein). The integrated gearbox may include a differential and a planetary gear set for transmitting power from the electric motor 54 to the rear vehicle wheels 55. A pump system 130 may be coupled to the gearbox of the electric motor 54 to flow lubricating (transmission) oil through the electric motor 54 during operation. Additionally, electric motor 54 may include a cooling system 148, including a coolant pump, and a heat exchanger in fluidic communication with the pump via a conduit. The cooling system 148 may be described more with reference to FIGS. 2-3. Electric motor 54 may also include at least one clutch. Controller 112 may send a signal to an actuator of the clutch to engage or disengage the clutch, so as to couple or decouple power transmission from the electric motor 54 to the rear vehicle wheels 55. Controller 112 may also be electronically coupled to the cooling system 148, e.g. in order to modulate operation of the cooling pump in response to the temperature of the electric motor 54.

Controller 112 may form a portion of a control system 114. Control system 114 is shown receiving information from a plurality of sensors 116 and sending control signals to a plurality of actuators 181. As one example, sensors 116 may include sensors such as a battery level sensor, clutch activation sensor, etc. As another example, the actuators may include the clutch, pump system 130, etc. The controller 112 may receive input data from the various sensors, process the input data, and trigger the actuators in response to the processed input data based on instruction or code programmed therein corresponding to one or more routines.

FIG. 2 schematically illustrates a cross-sectional view 200 of an electric motor 202 and a gearbox 203 of a vehicle system (such as vehicle system 6 of FIG. 1) in a housing 204. The electric motor 202 may be the same as the electric motor 54 of FIG. 1. The cross-sectional view may be taken along a y-z plane of axis system 290, with the radial direction of the electric motor 202 parallel to z-axis of the axis system 290 and the axial direction of the electric motor 202 parallel to the y-axis of the axis system 290. The electric motor 202 may be one of a variety of suitable electric alternating current (AC) motor configurations. For example, the electric motor 202 may be an AC motor, the types of which may include asynchronous (e.g., squirrel cage and wound rotor) and synchronous style motors. Synchronous motors such as multiphase, may be used in certain configurations. The styles of multiphase motors that may be deployed include permanent magnet, synchronous reluctance, hybrid synchronous (e.g., permanent magnet assisted synchronous reluctance), synchronous induction, and hysteresis. Continuing with the AC motor use-case, a synchronous permanent magnet motor may be utilized, in some instances, due to its relatively high conversion efficiency.

The electric motor 202 and the gearbox 203 may be enclosed by the housing 204. The housing 204 may enclose the electric motor 202 and the gearbox 203 from other components within the vehicle system. The housing 204 may be an integral casing shaped to cover each of the electric motor 202 and the gearbox 203. The housing 204 may surround an entirety of each of the electric motor 202 and the gearbox 203. The housing 204 may further include a first side 292 corresponding to a motor output side of the electric motor 202 and a second side 294 opposite of the first portion of the housing 204, the second side 294 proximal to the gearbox 203.

The housing 204 may be manufactured via a mold, additive manufacturing, or other process. The housing 204 may be a single, continuous piece. The housing 204 may include solid materials, configured to separate the electric motor 202 and the gearbox 203 from components outside of the housing 204. In one example, the housing 204 may include one or more of carbon fiber, aluminum, cast iron, steel, stainless steel, plastic, composites, and the like.

The electric motor 202 and the gearbox 203 may be integrally arranged within the same housing to reduce an amount of cooling and lubricant used, which may increase an efficiency of cooling or lubrication techniques performed by systems in the vehicle. The housing 204 may include an outer housing portion and an inner housing portion such that coolant may flow between the inner housing portion and the outer housing portion. Coolant may enter coolant channels of the housing 204 (e.g., via a coolant inlet) and may exit the housing 204 (e.g., via a coolant outlet) after flowing through the coolant channels. The housing 204, in one example, may include a plurality of stator laminations that are positioned within the housing 204. The electric motor 202 may further include an oil inlet that is mounted to and extends through the housing 204. The stator laminations may have a radial opening that are designed to receive oil from the oil inlet and direct the oil into at least one oil duct. In the motor, the oil duct may axially extend through at least a portion of the stator laminations. By flowing coolant through the housing in this way, the oil may be efficiently cooled without the use of an external heat exchanger, if desired. Consequently, the cooling arrangement of the motor may exhibit greater compactness than previous motor cooling systems, in some instances. Further, by omitting a heat exchanger for the oil cooling circuit, the electric motor may be more efficiently manufactured, if wanted.

In one example, collector rings may be positioned at opposing axial ends of the stator laminations included in the housing 204, whereby oil flowing through any oil ducts may be collected in cavities which may be defined radially outward of the collector ring. Oil flowing through the oil duct may be collected in the cavities radially outward from the collector rings. Further, the cavities may be interconnected and in fluidic communication (e.g., direct fluidic communication) with components included in the housing 204 (e.g., electric motor 202, gearbox 203, differential, shown in FIG. 3, and the like) that receive oil for cooling and/or lubrication. Thus, a hydraulic line may be fluidly coupled to the cavity (e.g., through the housing) so as to provide a flow path for routing oil to any lubricated components. In one example, the hydraulic line may be hydraulically coupled to the cavity formed above the collector ring and may route oil collected therein to another component. In this way, the oil may be effectively used to cool and/or lubricate other components in the electric drive unit in an efficient manner. In some examples, such as when the oil inlet is positioned at one axial end of the housing 204, one collector ring may be positioned at an axial end of the stator laminations opposite the axial end at which the oil inlet is located.

The housing 204 may further include a first bearing 210, which may be coupled to a first shaft 206. In one example, the first shaft 206 is an electric motor output shaft. The first shaft 206 may rotate relative to the first bearing 210 and transmit power to other components of the gearbox 203. A first gear 208 may be engaged with the first shaft 206 such that when the first shaft 206 rotates, the first gear 208 may rotate in a direction similar to a direction of rotation of the first shaft 206. In one example, the first gear 208 is an electric motor gear.

The first gear 208 may mesh with an idler gear 214, via teeth, such that when the first gear 208 rotates, the idler gear 214 may also rotate. In one example, the first gear 208 rotates in a first direction and the idler gear 214 rotates in a second direction, opposite the first direction. In one example, the first gear 208 and the idler gear 214 form a first gear stage, where the gear stage includes a driving gear (e.g., the first gear 208) and a driven gear (e.g., the idler gear 214), where the driving gear may be directly coupled to a power source (e.g., the first shaft 206 of the motor 202) and the driven gear may be meshed with the driving gear. A change in speed and torque may occur between the driving gear and the driven gear in a gear stage.

The idler gear 214 may be arranged on a second shaft 215, which may also be referred to herein as an idler gear shaft. In one example, the second shaft 215 is a support shaft. The second shaft 215 may rotate with the idler gear or it may be stationary and allow the idler gear 214 to rotate relatively thereto. The second shaft 215 may be placed in direct contact with a second bearing 212 and a third bearing 213. The second shaft 215 may extend in a direction parallel to the first shaft 206. In one example, the second bearing 212 and the third bearing 213 may be arranged proximally to the first bearing 210, wherein a portion of the housing 204 extends inwards and forms a physical barrier 211 between the first bearing 210 and the second and third bearing 212, 213. In one example, a size (e.g., a circumference) of the idler gear 214 may be larger than a size of the first gear 208.

The idler gear 214 may mesh with a second gear 216 via a plurality of teeth. As the idler gear 214 rotates in the second direction, the second gear 216 may rotate in the first direction, identical to the rotation of the first gear 208. The idler gear 214 and the second gear 216 may form a second gear stage. A size of the second gear 216 may be larger than a size of the idler gear 214. In the example of FIG. 2, the second gear 216 is the largest gear of the gearbox 203. In some examples, the sizes of one or more of the first gear 208, the idler gear 214, and the second gear 216 may be adjusted. In one example, the second gear 216 is an accessory gear.

Second gear 216 may be arranged on a third shaft 219. The third shaft 219 may be parallel to each of the first shaft 206 and the second shaft 215. The housing 204 may be contoured to accommodate the third shaft 219 while reducing an overall profile of the housing 204. In one example, the housing 204 may be more narrow (e.g., extend inward) at a region where the idler gear 214 and the second gear 216 engage with one another. The housing 204 may be less narrow at the third shaft 219. A size of the housing 204 may be tailored to a size of each of the electric motor 202 and the gearbox 203 such that the size of the housing 204 is relatively small.

When the second gear 216 rotates, the third shaft 219 may rotate in a direction identical to a direction of rotation of the second gear 216. The third shaft 219 may be rotate relatively to a fourth bearing 217 and a fifth bearing 218, where the fourth bearing 217 may be placed on a first side of the second gear 216 and the fifth bearing 218 may be placed on a second side of the second gear 216. The second gear 216 may be further coupled to a differential which may also be included in the same housing.

In one example, the idler gear 214 may transfer rotation from the first shaft 206 to the third shaft 219 and may preserve a power density of the system included in the housing 204. Although FIG. 2 shows the idler gear 214 in the first gear stage and the second gear stage, idler gears may be optionally included in other gear stages as well in alternate embodiments of FIG. 2. The housing 204, in conjunction with the first bearing 210, the second bearing 212, the third bearing 213, the fourth bearing 217, and the fifth bearing 218, may serve to fluidly seal the electric motor 202 and the gearbox 203. A differential 230 is arranged outside the housing 204 and coupled to gearbox 203.

FIG. 3 schematically illustrates a cross-sectional view 300 of an electric motor 302 and a gearbox 303 of a vehicle system (such as vehicle system 6 of FIG. 1). The cross-sectional view 300 is illustrated showing the electric motor 302, the gearbox 303, and the differential 330 in an expanded view for reasons of clarity. In one example, a portion of the cross-sectional view 300 including the electric motor 302 and the gearbox 303 is taken along to the y-z plane. The portion of the cross-sectional view 300 including the gear box 303 and the differential 330 may be taken along the x-y plane, normal to the y-z plane. In this way, when arranged in a shared housing, a central axis 396 of the differential may be between the central axis 392 of the electric motor 302 and the central axis 394 of a second gear 318 of the gearbox 303 along the y-z plane. In this way, when measured along the y-z plane, a distance between the central axis 392 and the central axis 396 may be less than a distance between the central axis 392 and the central axis 394. A schematic of the electric motor 302, the gearbox 303 and the differential 330 arranged in a common housing 402 is shown in the embodiment 400 of FIG. 4. The electric motor 302 and the gearbox 303 may be integrally arranged in a same housing. The electric motor 302 may be the same as the electric motor 54 of FIG. 1.

The electric motor 302 may include a first shaft 306 (interchangeably referred to as an electric motor shaft 306). The first shaft 306 may include an input end 301 and an output end 304. Along a central portion of the first shaft 306, nozzles 321 may be positioned to spray lubricant from a journal onto windings 322 and stator 324. The journal may extend along a majority of a length of the first shaft 306. which may be longer in the axial direction than electric motor 302. The first shaft 306 may rotate relatively to the first bearing 309 and the second bearing 310. Lubricant ejected from the nozzles 321 may flow to the first bearing 309 and the second bearing 310 via lubricant channels shaped within the housing.

A first gear 308 may be engaged with the first shaft 306. The engagement between the first gear 308 and the first shaft 306 may force the first gear 308 to rotate as the first shaft 306 rotates. The first gear 308 may be in a meshed engagement with an idler gear 314. The idler gear 314 may be arranged on a support shaft 316 (interchangeably referred to as a second shaft 316), which may be fixed or moveable. An axis of the second shaft 316 may be parallel to the central axis 392 of the first shaft 306 and the central axis 394 of a third shaft 320. The idler gear 314 may be in meshed engagement with the second gear 318 arranged on the third shaft 320.

The second gear 318 may be in communication with a differential 330. The differential 330 may be driven via the second gear 318. The differential 330 may include an input differential gear 332 in meshed engagement with the second gear 318. The input differential gear 332 may rotate along an axis normal to the central axis 394. In one example, each of the first gear 308, the idler gear 314, and the second gear 318 rotate about axes parallel to one another and normal to the input differential gear 332.

One or more side gears 334, 344 may be in meshed engagement with the input differential gear 332. The side gears 334 may be configured to rotate via energy received from the input differential gear. In one example, each of the side gear 334, 344 may rotate individual shafts 336, 346, respectively. In one example, a first side gear 334 rotates a first differential shaft 336 coupled to a first rotor 338. A second side gear 344 rotates a second differential shaft 346 coupled to a second rotor 348.

In the example of FIG. 3, each of the electric motor 302, the gearbox 303, and the differential 330 may be arranged which in a single housing. The housing may further include lubricant passages configured to lubricate one or more of the electric motor 302, the gearbox 303, and the differential 330. By integrating the electric motor 302 and the gearbox 303 in the same housing, an overall size on an electric motor system coupled to a gearbox including an idler gear may be reduced. The idler gear may provide a large ratio flexibility relative to gear systems without an idler gear. The idler gear may provide low ratios for slow rotating motors and high ratios for faster rotating motors. The idler gear may further decrease an overall size of the housing due to a larger gear being needed in the same gear stage, if the idler gear is omitted. The larger gear may be heavier than the idler gear, which may decrease a power density of the system.

The housing may be tailored to the shape of each of the electric motor, the gearbox, and the differential. The housing may be spaced away from surfaces of the electric motor, the gearbox, and the differential based on tolerances set by a manufacturer. The housing may contour to match indentations and protrusions of the components arranged therein so as to minimize an interior volume of the housing. In this way, a compact housing is provided with an electric motor and gearbox including an idler gear, which allows for a range of compact power dense axles.

In this way, by integrating a differential, a gearbox, and an electric motor into a same housing, a weight and a footprint of an electric drive unit may be reduced and an amount of coolant used may be reduced. Further, by integrating an idler gear into the gearbox, a power density of the electric drive unit may be increased. Example configurations described above may offer distinct advantages. In one example, integrating the idler gear into the gearbox may provide an increased allowable range of gear ratios, relative to a conventional gearbox arrangement, as well as a compact and power dense geometry, as the entire gearbox may be included in the same housing as other components in the electric drive unit. Additionally, coolant and lubrication may be shared between the gearbox and the electric motor, providing simplified cooling and lubrication mechanisms compared to a conventional electric drive unit.

The disclosure also provides support for a gearbox assembly including an electric motor enclosed in a housing, a gearbox enclosed in the housing, the gearbox having an idler gear coupled to an electric motor gear. In a first example of the system, the idler gear is directly coupled to the electric motor gear, the electric motor gear directly coupled to an electric motor output shaft. In a second example of the system, optionally including the first example, an electric motor rotational axis is parallel with an idler gear rotational axis. In a third example of the system, optionally including one or both of the first and second examples, the housing has a first portion coupled on a motor output side and a second portion opposite the first portion, the first and second portions enclosing the electric motor and gearbox. In a fourth example of the system, optionally including one or more or each of the first through third examples, the system further comprises: an accessory gear coupled directly to the idler gear. In a fifth example of the system, optionally including one or more or each of the first through fourth examples, an accessory gear rotational axis is parallel with the idler gear rotational axis. In a sixth example of the system, optionally including one or more or each of the first through fifth examples the system further comprising a differential, the differential driven by the accessory gear.

The disclosure also provides support for a system including a gearbox comprising an idler gear coupled to an electric motor gear of an electric motor, and a housing surrounding an entirety of each of the gearbox and the electric motor. In a first example of the system, the housing is a single piece. In a second example of the system, optionally including the first example, the idler gear is further coupled to an accessory gear, wherein the accessory gear drives a differential. In a third example of the system, optionally including one or both of the first and second examples, the differential is arranged outside the housing. In a fourth example of the system, optionally including one or more or each of the first through third examples, the housing is tailored to the gearbox and the electric motor. In a fifth example of the system, optionally including one or more or each of the first through fourth examples, lubricant from the electric motor travels to the gearbox within the housing. In a sixth example of the system, optionally including one or more or each of the first through fifth examples, the idler gear and the electric motor gear rotate along parallel axes.

The disclosure also provides support for a vehicle system including an electric motor and a gearbox integrally arranged within a housing, wherein an electric motor gear is coupled to an idler gear of the gearbox, and wherein the idler gear is coupled to an accessory gear. In a first example of the system, the accessory gear is arranged within the housing, and wherein the accessory gear and the electric motor gear rotate in identical directions. In a second example of the system, optionally including the first example, the accessory gear drives a differential. In a third example of the system, optionally including one or both of the first and second examples, the housing shapes a physical barrier between a first bearing and a second bearing, wherein the first bearing is arranged on an electric motor shaft and the second bearing is arranged on a support shaft. In a fourth example of the system, optionally including one or more or each of the first through third examples, the idler gear is arranged on the support shaft. In a fifth example of the system, optionally including one or more or each of the first through fourth examples, the accessory gear is larger than the idler gear, and wherein the idler gear is larger than the electric motor gear.

It will be appreciated that the configurations herein are exemplary in nature, and that these specific examples are not to be considered in a limiting sense, because numerous variations are possible. For example, the above technology can be applied to a variety of systems that include electric motors. The subject matter of the present disclosure includes all novel and non-obvious combinations and sub-combinations of the various systems and configurations, and other features, functions, and/or properties disclosed herein.

As used herein, the terms "approximately" and "substantially" are construed to mean plus or minus five percent of the range unless otherwise specified.

FIGS. 2-4 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A gearbox assembly, comprising:
an electric motor enclosed in a housing;
a gearbox enclosed in the housing, the gearbox having an idler gear directly coupled to an electric motor gear arranged on a first shaft, the electric motor gear directly coupled to an electric motor output shaft, wherein the idler gear is a single gear arranged on a second shaft;
an accessory gear coupled directly to the idler gear, the accessory gear arranged on a third shaft; and
a differential arranged on a differential shaft different than the third shaft, wherein an input differential gear is in meshed engagement with the accessory gear.

2. The gearbox assembly of claim 1, wherein an electric motor rotational axis is parallel with an idler gear rotational axis.

3. The gearbox assembly of claim 2, wherein an accessory gear rotational axis is parallel the idler gear rotational axis and a central axis of the differential is between the first shaft and the third shaft, and wherein a distance between the central axis of the differential and the first shaft is less than a distance between the first shaft and the third shaft.

4. The gearbox assembly of claim 1, wherein the housing has a first portion coupled on a motor output side and a second portion opposite the first portion, the first and second portions enclosing the electric motor and the gearbox.

5. A system, comprising:
a gearbox comprising a single idler gear coupled to an electric motor gear of an electric motor and to an accessory gear, the accessory gear configured to drive an input differential gear of a differential via meshed engagement with the input differential gear; and
a housing surrounding each of the gearbox and the electric motor in a radial direction.

6. The system of claim 5, wherein the housing surrounds each of the gearbox and the electric motor in an axial direction normal to the radial direction.

7. The system of claim 5, wherein the differential is arranged outside the housing.

8. The system of claim 5, wherein the housing is tailored to the gearbox and the electric motor.

9. The system of claim 5, wherein a portion of the housing comprising the electric motor is fluidly coupled to a portion of the housing comprising the gearbox.

10. The system of claim 5, wherein the idler gear and the electric motor gear rotate along parallel axes.

11. A vehicle system, comprising:
an electric motor and a gearbox integrally arranged within a single housing, wherein an electric motor gear is coupled to a single idler gear of the gearbox, wherein the idler gear is coupled to an accessory gear, the accessory gear in meshed engagement with an input differential gear to drive a differential arranged on a differential shaft different than a shaft on which the accessory gear is arranged, and wherein each of the electric motor gear, the idler gear, and the accessory gear rotate along parallel axes.

12. The vehicle system of claim 11, wherein the accessory gear is arranged within the housing, and wherein the accessory gear and the electric motor gear rotate in identical directions.

13. The vehicle system of claim 11, wherein the housing shapes a physical barrier between a first bearing and a second bearing, the housing surrounding each of the electric motor and the gearbox in an axial direction, and wherein the first bearing is arranged on an electric motor shaft and the second bearing is arranged on a support shaft.

14. The vehicle system of claim 13, wherein the idler gear is arranged on the support shaft.

15. The vehicle system of claim 11, wherein the accessory gear is larger than the idler gear, and wherein the idler gear is larger than the electric motor gear.

* * * * *